United States Patent
Donnelly (10) Patent No.: US 11,317,269 B1
(45) Date of Patent: Apr. 26, 2022

(54) WEARABLE DEVICE DETECTION OF LIFE THREATENING EVENTS

(71) Applicant: T-MOBILE USA, INC., Bellevue, WA (US)

(72) Inventor: Sean Donnelly, Allen, TX (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/953,710

(22) Filed: Nov. 20, 2020

(51) Int. Cl.
  *H04W 4/90* (2018.01)
  *H04W 4/38* (2018.01)
  *H04W 76/50* (2018.01)
  *H04W 4/021* (2018.01)
  *H04W 4/02* (2018.01)
  *G08B 25/01* (2006.01)

(52) U.S. Cl.
  CPC ............ *H04W 4/90* (2018.02); *G08B 25/016* (2013.01); *H04W 4/021* (2013.01); *H04W 4/027* (2013.01); *H04W 4/38* (2018.02); *H04W 76/50* (2018.02)

(58) Field of Classification Search
  CPC ......... H04W 4/90; H04W 4/38; H04W 76/50; H04W 4/027; H04W 4/021; G08B 25/016
  See application file for complete search history.

(56) References Cited

U.S. PATENT DOCUMENTS

| | | | |
|---|---|---|---|
| 8,890,685 B1 * | 11/2014 | Sookman | G08B 25/008 340/539.13 |
| 9,848,313 B1 * | 12/2017 | Cottle | G06F 40/30 |
| 9,940,508 B2 | 4/2018 | Kaps et al. | |
| 10,130,272 B2 | 11/2018 | DeForest | |
| 10,540,877 B1 | 1/2020 | Gersten | |
| 2011/0117878 A1 * | 5/2011 | Barash | G08B 25/005 340/539.12 |
| 2017/0140629 A1 * | 5/2017 | Briggs | G08B 21/043 |
| 2017/0262697 A1 * | 9/2017 | Kaps | G11B 27/022 |
| 2019/0313204 A1 * | 10/2019 | Ayoub | H04W 4/35 |

* cited by examiner

*Primary Examiner* — Minjung Kim
(74) *Attorney, Agent, or Firm* — Marshall, Gerstein & Borun LLP (57) ABSTRACT

Systems and methods for triggering an emergency call based on sensor data indicative of the response of a number of users in a given location to a possible emergency situation are provided. In an example computer-implemented method, an indication of data captured by respective sensors associated with each of a plurality of individuals in a geographic area may be received, and an indication that each of the plurality of individuals is reacting to a possible dangerous situation in the geographic area may be determined based on the data captured by the respective sensors associated with each of the plurality of individuals. A communication connection may be established with an emergency services dispatcher to facilitate dispatching emergency services to the geographic area based on the indication that each of the plurality of individuals is reacting to the possible dangerous situation in the geographic area.

17 Claims, 4 Drawing Sheets

WEARABLE DEVICE DETECTION OF LIFE THREATENING EVENTS

FIELD OF THE DISCLOSURE

The present disclosure generally relates to emergency communications and, more particularly, to triggering an emergency call based on sensor data (e.g., heart rate or motion data from wearable devices) indicative of the responses of a number of users in a given location to a possible emergency situation.

BACKGROUND

In an emergency situation, such as a shooting or other terrorist attack, a fire, an explosion, an extreme weather event, etc., individuals may be more focused on reacting to the immediate emergency situation and protecting themselves, or getting themselves to safety, than communicating with emergency service providers (e.g., police departments, fire departments, hospitals, ambulances, etc.) regarding the emergency situation. For example, an individual attempting to escape a fire may not have time to stop and dial 911 to call a fire department to put out the fire. However, emergency service providers should ideally be notified about emergency situations as soon as possible so that they can remedy the emergency situation or otherwise tend to needs of those injured or otherwise endangered by the emergency situation.

Many individuals use mobile devices or wearable devices with built-in sensors capable of continuous data collection, which are worn or carried by the individuals nearly constantly. Such mobile devices or wearable devices are typically connected to communication networks to enable communication with resource servers, application programming interfaces (APIs), and other individuals via synchronous communication sessions or asynchronous data messages. However, individuals must still manually activate the mobile devices or wearable devices to notify emergency service providers or others of emergency situations.

SUMMARY

Generally, the disclosure provides systems and methods for triggering an emergency call based on sensor data from mobile computing devices of a number of users in a given location, or within a given proximity of one another, indicative of users' responses to a possible emergency situation (e.g., a shooting or other terrorist attack, a fire, an explosion, or an extreme weather event). In one example, the emergency call is triggered based on sensor data (e.g., obtained by wearable device heart rate monitors associated with the users) indicating that a number of co-located users' heart rates are spiking at approximately the same time. In another example, the emergency call is triggered based on sensor data (e.g., obtained by wearable fitness trackers associated with the users) indicating sudden rapid movement (e.g., indicating that the user is running away from something) from a number of co-located users at approximately the same time. In some examples, the emergency call may be placed automatically, while in other examples, a prompt to confirm the need for an emergency call may be sent to mobile computing devices of users who may be affected by the emergency situation. For instance, all of the users whose heart rates spike may be prompted to confirm the need for an emergency call (and/or to confirm the nature of the emergency). Once one of the users confirms the need for the emergency call, the emergency call may be placed (i.e., in some cases advantageously eliminating the need for multiple additional emergency calls from the other users).

In one aspect, a computer-implemented method is provided, comprising: receiving an indication of data captured by respective sensors associated with each of a plurality of individuals in a geographic area; determining, based on the data captured by the respective sensors associated with each of the plurality of individuals, an indication that each of the plurality of individuals is reacting to a possible dangerous situation in the geographic area; and establishing a communication connection with an emergency services dispatcher to facilitate dispatching emergency services to the geographic area based on the indication that each of the plurality of individuals is reacting to the possible dangerous situation in the geographic area.

In another aspect, a system is provided, the system including: one or more processors; and a non-transitory program memory communicatively coupled to the one or more processors and storing executable instructions that, when executed by the one or more processors, cause the processors to: receive an indication of data captured by respective sensors associated with each of a plurality of individuals in a geographic area; determine, based on the data captured by the respective sensors associated with each of the plurality of individuals, an indication that each of the plurality of individuals is reacting to a possible dangerous situation in the geographic area; and establish a communication connection with an emergency services dispatcher to facilitate dispatching emergency services to the geographic area based on the indication that each of the plurality of individuals is reacting to the possible dangerous situation in the geographic area.

In still another aspect, a non-transitory computer readable storage medium is provided, the non-transitory computer readable storage medium storing computer-readable instructions that, when executed by one or more processors, cause the one or more processors to: receive an indication of data captured by respective sensors associated with each of a plurality of individuals in a geographic area; determine, based on the data captured by the respective sensors associated with each of the plurality of individuals, an indication that each of the plurality of individuals is reacting to a possible dangerous situation in the geographic area; and establish a communication connection with an emergency services dispatcher to facilitate dispatching emergency services to the geographic area based on the indication that each of the plurality of individuals is reacting to the possible dangerous situation in the geographic area.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
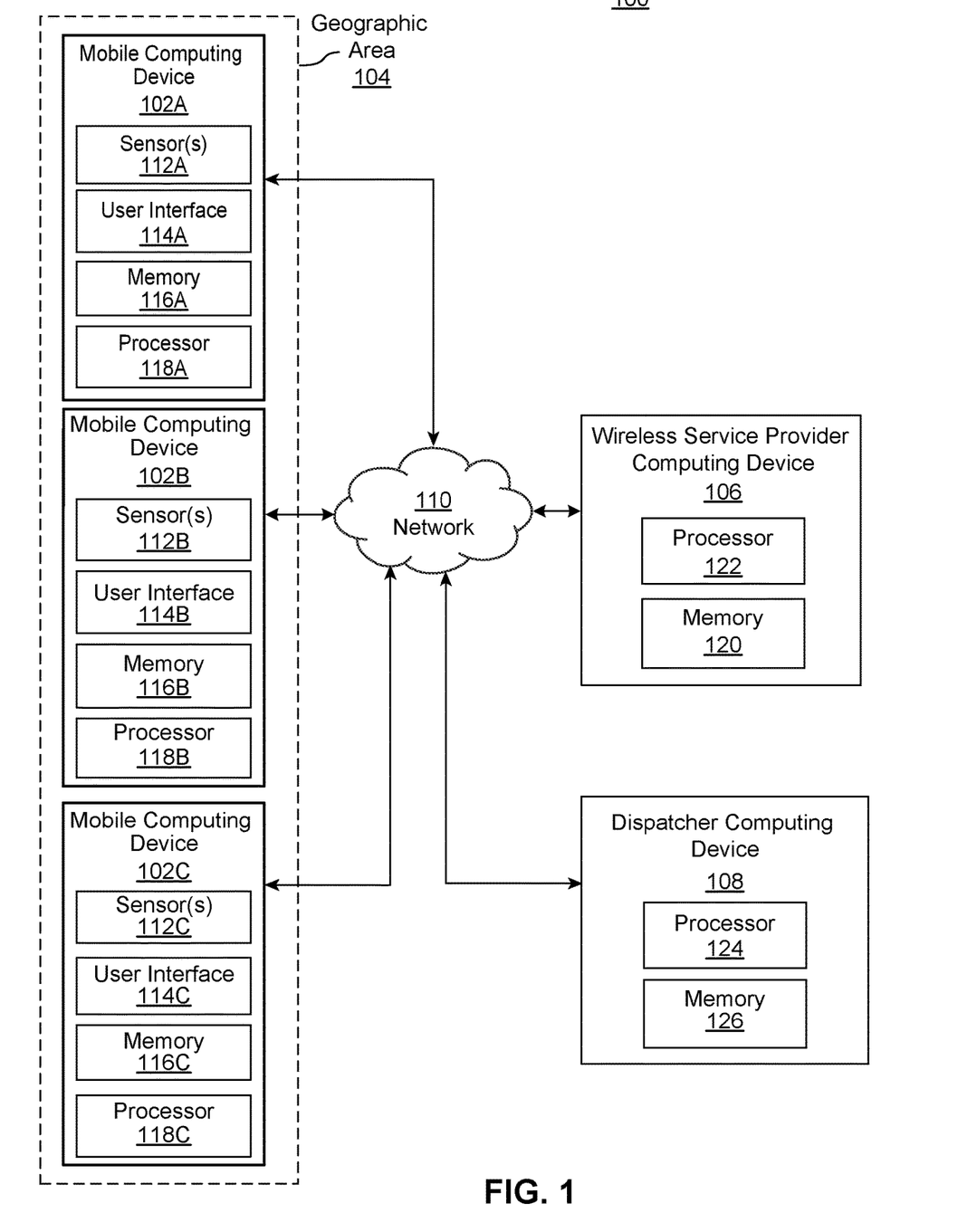
FIG. 1 illustrates a block diagram of an exemplary system for triggering an emergency call based on sensor data indicative of the response of a number of users in a given location to a possible emergency situation, in accordance with some embodiments.

Referring now to the drawings, FIG. 1 illustrates a block diagram of an exemplary system 100 for triggering an emergency call based on sensor data indicative of the response of a number of users in a given location to a possible emergency situation, in accordance with some embodiments. The high-level architecture illustrated in FIG. 1 may include both hardware and software applications, as well as various data communications channels for communicating data between the various hardware and software components, as is described below.

The system 100 may include a plurality of mobile computing devices 102A, 102B, and 102C (which may include smart phones, smart watches, smart glasses, smart jewelry, fitness trackers, etc.) located within a geographic area 104, a wireless service provider computing device 106, and a dispatcher computing device 108. The mobile computing devices 102A-102C may be configured to communicate with the wireless service provider computing device 106 via one or more networks 110. Similarly, the wireless service provider computing device 106 may be configured to communicate with the dispatcher computing device 108 via one or more networks 110.

Each of the mobile computing devices 102A-102C may include respective one or more sensors 112A-112C, which may include location sensors (e.g., Global Positioning System (GPS) sensors) configured to detect a location associated with the mobile computing device 102A-102C, as well as heart rate sensors configured to detect a heart rate associated with the user of the mobile computing device 102A-102C, motion sensors configured to detect motion of the user of the mobile computing device 102A-102C, or other sensors designed to record data associated with the body of the user of the mobile computing device 102A-102C, including data indicative of stress responses associated with the body of the user of the mobile computing device 102A-102C (e.g., galvanic skin response sensors, blood pressure sensors, or thermal sensors). Additionally, each of the mobile computing devices 102A-102C may include respective user interfaces 114A-114C configured to provide information to users and/or receive inputs from users.

Each of the mobile computing devices 102A-102C may include one or more processors 118A-118C, such as one or more microprocessors, controllers, and/or any other suitable type of processor, and may further include a respective memory 116A-116C (e.g., volatile memory, non-volatile memory) accessible by the one or more respective processors 118A-118C (e.g., via a memory controller). The one or more processors 118A-118C of each of the mobile computing devices 102A-102C may interact with the respective memories 116A-116C to obtain, for example, computer-readable instructions stored in the respective memories 116A-116C. The instructions may include instructions for performing various actions related to the techniques disclosed herein, e.g., capturing sensor data associated with a user of the mobile computing device 102A-102C indicative of the location of the user as well as data associated with the body of the user, and sending the captured data to a wireless service provider computing device 106. In some examples, the instructions may include instructions for receiving a request for confirmation of the existence of an emergency situation (e.g., from the wireless service provider computing device 106), presenting a request for confirmation of the existence of an emergency situation (e.g., via the user interface 114A-114C), receiving a response from the user of the mobile computing device 102A-102C (e.g., via the user interface 114A-114C), and sending the response from the user of the mobile computing device 102A-102C (e.g., to the wireless service provider computing device 106). In particular, the computer-readable instructions stored on the respective memories 116A-116C of each mobile computing device 102A-102C may include instructions for carrying out any of the steps of the method 300 described in greater detail below with respect to FIG. 3, or any of the steps of the method 400 described in greater detail below with respect to FIG. 4.

The wireless service provider computing device 106 may similarly include one or more processors 122, such as one or more microprocessors, controllers, and/or any other suitable type of processor, and may further include a memory 120 (e.g., volatile memory, non-volatile memory) accessible by the one or more processors 122 (e.g., via a memory controller). The one or more processors 122 of the wireless service provider computing device 106 may interact with the memory 120 to obtain, for example, computer-readable instructions stored in the memory 120. The instructions may include instructions for performing various actions related to the techniques disclosed herein, e.g., receiving indications of location data and other sensor data from a plurality of mobile computing devices 102A-102C within a geographic area 104 via the network 112, determining that there is a possible dangerous situation or emergency situation occurring within the geographic area 104 based on the location data and other sensor data from the plurality of mobile computing devices 102A-102C indicating likely responses to danger by multiple users of the mobile computing devices 102A-102C within the geographic area 104, requesting and/or receiving a confirmation of the existence of the possible dangerous situation or emergency situation from one or more of the mobile computing devices 102A-102C via the network 112, and establishing a communication connection with an emergency services dispatcher (e.g., the dispatcher computing device 108) via the network 112 in order to facilitate dispatching emergency services to the geographic area 104, e.g., by sending the dispatcher computing device 108 an indication of the location of the mobile computing devices 102A-102C or an indication of the geographic area 104. In particular, the computer-readable instructions stored on the memory 120 of the wireless service provider computing device 106 may include instructions for carrying out any of the steps of the method 300 described in greater detail below with respect to FIG. 3.

Finally, the dispatcher computing device 108 may include one or more processors 124, such as one or more microprocessors, controllers, and/or any other suitable type of processor. The dispatcher computing device 108 may further include a memory 126 (e.g., volatile memory, non-volatile memory) accessible by the one or more processors 124 (e.g., via a memory controller). The one or more processors 124 may interact with the memory 126 to obtain, for example, computer-readable instructions stored in the memory 124. For instance, the instructions may include instructions for receiving an indication of locations of one or more of the mobile computing devices 102A-102C (or an indication of the location of the geographic area 104), as well as instructions for providing the location of the mobile computing device 102 to appropriate local emergency services (e.g., police department, fire department, ambulance, etc.). In particular, the computer-readable instructions stored on the memory 126 of the dispatcher computing device 108 may include instructions for carrying out any of the steps of the method 300 described in greater detail below with respect to FIG. 3.

Figure 2:
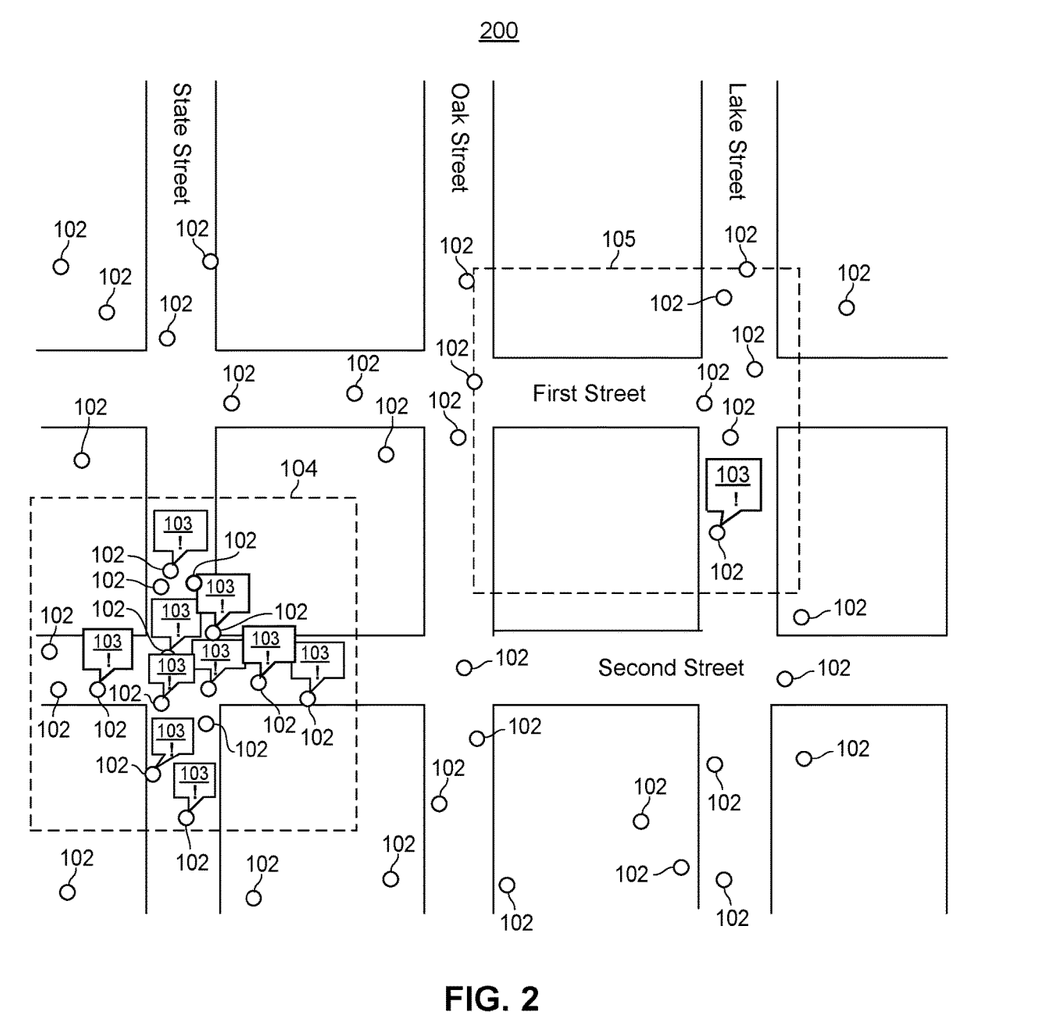
FIG. 2 illustrates an exemplary map view including locations of a number of users responding to a possible emergency situation, in accordance with some embodiments.

FIG. 2 illustrates an exemplary map view 200 including locations of a number of users (e.g., determined by proxy based on the locations of their respective mobile computing devices) responding to a possible emergency situation, in accordance with some embodiments. Specifically, FIG. 2 illustrates locations of mobile computing devices 102 associated with various users on the map view 200, and includes indications 103 of which mobile computing devices 102 within various geographic areas 104 and 105 of a city or town have captured sensor data indicative of a response of a user to a possible emergency situation, e.g., over a certain period of time. For instance, an example indication 103 of a user reaction to a possible dangerous situation may be a sudden spike in heart rate (e.g., possibly indicative of user stress related to a dangerous situation such a shooting or other terrorist attack, a fire, an explosion, an extreme weather event, etc.), or a sudden spike in motion (e.g., possibly indicative of a user running, jumping, ducking, or otherwise quickly moving in reaction to a dangerous situation).

As shown in FIG. 2, a majority of the mobile computing devices 102 within the geographic area 104 are associated with indications 103 of reactions to a possible dangerous situation. Specifically, FIG. 2 shows that there are fifteen mobile computing devices 102 within the geographic area 104, and ten of the mobile computing devices 102 within the geographic area 104 are associated with indications 103 of user reactions to a possible dangerous situation. In some examples, determining that there is likely a dangerous situation occurring in the geographic area 104 may be based on one or more group response indications, e.g., the number of mobile computing devices 102 associated with indications 103 of reactions to possible dangerous situations in the geographic area 104 (e.g., ten mobile computing devices 102), the density of mobile computing devices 102 associated with such indications 103 in the geographic area 104 (e.g., ten mobile computing devices 102 within a known size of the geographic area 104), and/or the percentage or ratio of mobile computing devices 102 associated with such indications 103 out of the total number of mobile computing devices in the geographic area 104 (e.g., ten mobile computing devices 102 out of fifteen total mobile computing devices 102 in the geographic area 104).

In contrast, as shown in FIG. 2, there is only one mobile computing device 102 associated with an indication 103 of a reaction to a possible dangerous situation within another geographic area 105. Accordingly, it may be less likely that there is a dangerous situation occurring within the second geographic area 105, compared to the first geographic area 104, where there are ten mobile computing devices 102 associated with indications 103 of reactions to possible dangerous situations. For instance, the heart rate or motion of the user of the one mobile computing device 102 associated with such an indication 103 within the second geographic area 105 may have spiked for a benign reason—e.g., the user of the mobile computing device 102 was running to catch a bus or the sensor may simply be malfunctioning. That is, in some examples, determining that there is less likely to be a dangerous situation occurring in a given geographic area 105 may be based on a failure to meet one or more group response indications, e.g., a small number of computing devices 102 associated with such indications 103 (e.g., two mobile computing devices 102), a low density of mobile computing devices 102 associated with such indications in a given geographic area (e.g., two mobile computing devices within a known size of the geographic area 105), and/or a low percentage or ratio of mobile computing devices associated with such indications 103 out of the total number of mobile computing devices in the geographic area 105 (e.g., two mobile computing devices 102 out of eight total mobile computing devices in the geographic area 105).

Figure 3:
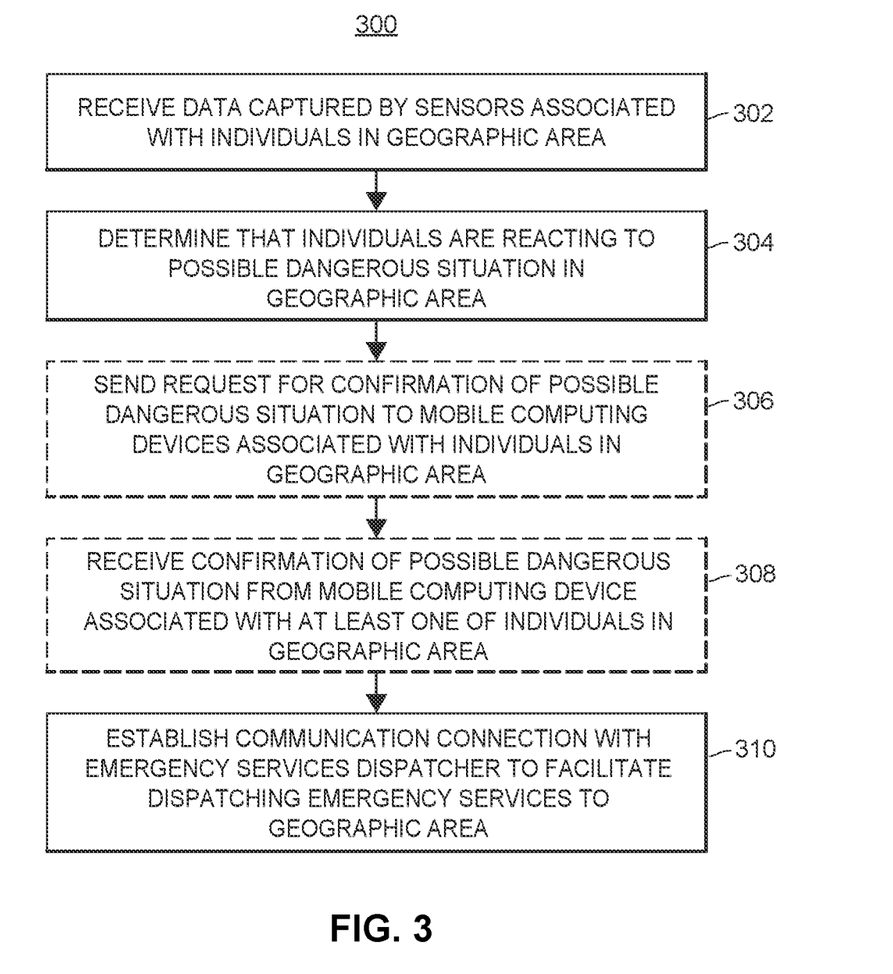
FIG. 3 illustrates an exemplary flow diagram of an exemplary method for triggering an emergency call based on sensor data indicative of the response of a number of users in a given location to a possible emergency situation, in accordance with some embodiments.

FIG. 3 illustrates an exemplary flow diagram of an exemplary method 300 for triggering an emergency call based on sensor data indicative of the response of a number of users in a given location to a possible emergency situation, in accordance with some embodiments. One or more steps of the method 300 may be implemented as a set of instructions stored on a computer-readable memory 122 and executable on one or more processors 120.

At block 302, an indication of data captured by respective sensors associated with each of a plurality of individuals in a geographic area may be received. For instance, in some examples the sensors may include heart rate sensors and/or motion sensors. In some examples, the sensors may be components of respective mobile computing devices associated with each of the individuals. In some examples, the sensors may be components of smart phones associated with each of the individuals. Moreover, in some examples, the sensors may be components of wearable mobile computing devices associated with each of the individuals, such as wearable fitness trackers or smart watches, which may further be communicatively connected to smart phones of the individuals.

At block 304, a determination may be made, based on the data captured by the respective sensors associated with each of the plurality of individuals, of an indication that each of the plurality of individuals is reacting to a possible dangerous situation in the geographic area. An example method of making such a determination is shown in greater detail at FIG. 4 below.

For instance, when the sensors include heart rate sensors, the indication that each of the plurality of individuals is reacting to the possible dangerous situation may include an indication of heart rate spikes associated with each of the plurality of individuals, i.e., indicating that many individuals in the same geographic location are experiencing a sudden rising heart rate, possibly due to stress, fear, and/or panic. As another example, when the sensors include motion sensors, the indication that each of the plurality of individuals is reacting to the possible dangerous situation may include an indication of spikes in motion associated with each of the plurality of individuals over a short period of time, i.e., indicating that many individuals in the same geographic location are suddenly moving quickly, possibly due to running from a dangerous situation. Moreover, in some examples, when the sensors include motion sensors, the indication that each of the plurality of individuals is reacting to the possible dangerous situation may include an indication of directions in which each individual is moving. Individuals moving in different directions may be an indication that there is likely a dangerous situation in the geographic area, while individuals moving largely in the same direction may be an indication of something else, such as a group of individuals running together in a 5K or 10K race.

In some examples, the sensors may include multiple types of sensors, and determining the indication may include verifying an indication that the individuals are reacting to the possible dangerous situation based on data from one type of sensor using an indication that the individuals are reacting to the possible dangerous situation based on data from another type of sensor. For instance, if heart rate data from heart rate sensors indicates that the individuals are reacting to a possible dangerous situation (e.g., many heart rate spikes), this indication may be checked against motion data from motion sensors. Similarly, if motion data from motion sensors indicates that the individuals are reacting to a possible dangerous situation (e.g., sudden rapid motion from many individuals), this indication may be checked against heart rate data from heart rate sensors. For example, generally speaking, in a dangerous situation, both a heart rate spike and a sudden motion may occur. In some examples, if there are many heart rate spikes indicated by heart rate data but no motion spikes indicated by motion data, or vice versa, a dangerous situation may not be occurring.

Moreover, in some examples, the determination may be based on the number of individuals reacting to the possible dangerous situation, the density of the individuals reacting to the possible dangerous situation within a given geographic area, the ratio or percentage of individuals reacting to the possible dangerous situation compared to individuals not having such reactions within the geographic area, the ratio or percentage of individuals reacting to the possible dangerous situation within the geographic area compared to individuals outside of the geographic area, etc., as discussed above with respect to FIG. 2.

At block 306, optionally, a request for confirmation of the possible dangerous situation may be sent to respective mobile computing devices associated with each of the plurality of individuals in the geographic area. For instance, the request for confirmation may be presented to users via the user interfaces of their mobile computing devices, and may indicate that there is a suspected or possible dangerous situation or emergency situation in the geographic area, and request that each user confirm whether or not there is actually a dangerous situation or emergency situation in the geographic area. In some examples, the request for confirmation and/or the confirmation response may be a confirmation that there is generally some type of emergency situation or dangerous situation, while in some examples, the request for confirmation and/or the confirmation response may include an indication of the nature of the emergency situation or dangerous situation, or an indication of which types of emergency services may be needed. In some examples, the request for confirmation may be a displayed notification including a selectable button where the user may provide an indication of his or her response as to whether or not there is actually a dangerous situation or emergency situation in the area, as well as an indication of the nature of the emergency situation or dangerous situation, or an indication of which types of emergency services may be needed. Moreover, in some examples, the request for confirmation may be an audio notification, and the user may indicate his or her response as to whether or not there is actually a dangerous situation or emergency situation in the area by speaking (i.e., so that a virtual assistant or other voice recognition capability of the mobile computing device may recognize and record the user's answer).

At block 308, optionally, a confirmation of the possible dangerous situation may be received from a mobile computing device associated with at least one of the plurality of individuals in the geographic area. For instance, an indication of each user's response confirming or denying that there is a dangerous situation or emergency situation in the geographic area, indicating a specific type of dangerous situation or emergency situation in the geographic area, and/or not responding, may be sent from each user's mobile computing device, and a determination may be made as to whether at least one of the responses is a confirmation. In some examples, a lack of response from any of the mobile computing devices may be considered a confirmation (e.g., indicating that users are not responding due to death or injury related to the emergency situation).

At block 310, a communication connection may be established with a dispatcher or other provider of emergency services (e.g., police, ambulance, fire department, etc.), to facilitate dispatching emergency services to the geographic area based on the indication that each of the plurality of individuals is reacting to the possible dangerous situation in the geographic area. The dispatcher may send an appropriate emergency response to the location of the geographic area (e.g., based on any information provided by the users of the mobile computing devices about the nature of the emergency). The communication connection may be established between the dispatcher and one or more mobile computing devices of individuals in the geographic area, or the communication connection may be established between the dispatcher and the wireless service provider computing device. The communication connection may be a synchronous voice or video connection, or the communication connection may be an asynchronous data connection by which one or more messages containing data regarding the incident may be sent to the dispatcher. Regardless of the type of communication connection, data regarding a location associated with the geographic area (e.g., a central location of the individuals at the beginning of the incident) may be sent to the dispatcher. In some such embodiments, additional data regarding the incident may likewise be sent to the dispatcher, such as the number of individuals present, directions of movement of the individuals, current locations of the individuals, numbers of individuals not moving (e.g., individuals who may be injured or incapacitated), etc.

In some examples, the communication connection may be established automatically, while in some examples, the communication connection may be established based on receiving the confirmation of the possible dangerous situation from a mobile computing device associated with at least one of the plurality of individuals in the geographic area at block 308 (or the lack of response from any of the plurality of individuals in geographic area). For instance, in some examples, one confirmation from one of the mobile computing devices associated with one individual may be sufficient to initiate the establishment of the communication connection with the emergency services dispatcher.

Figure 4:
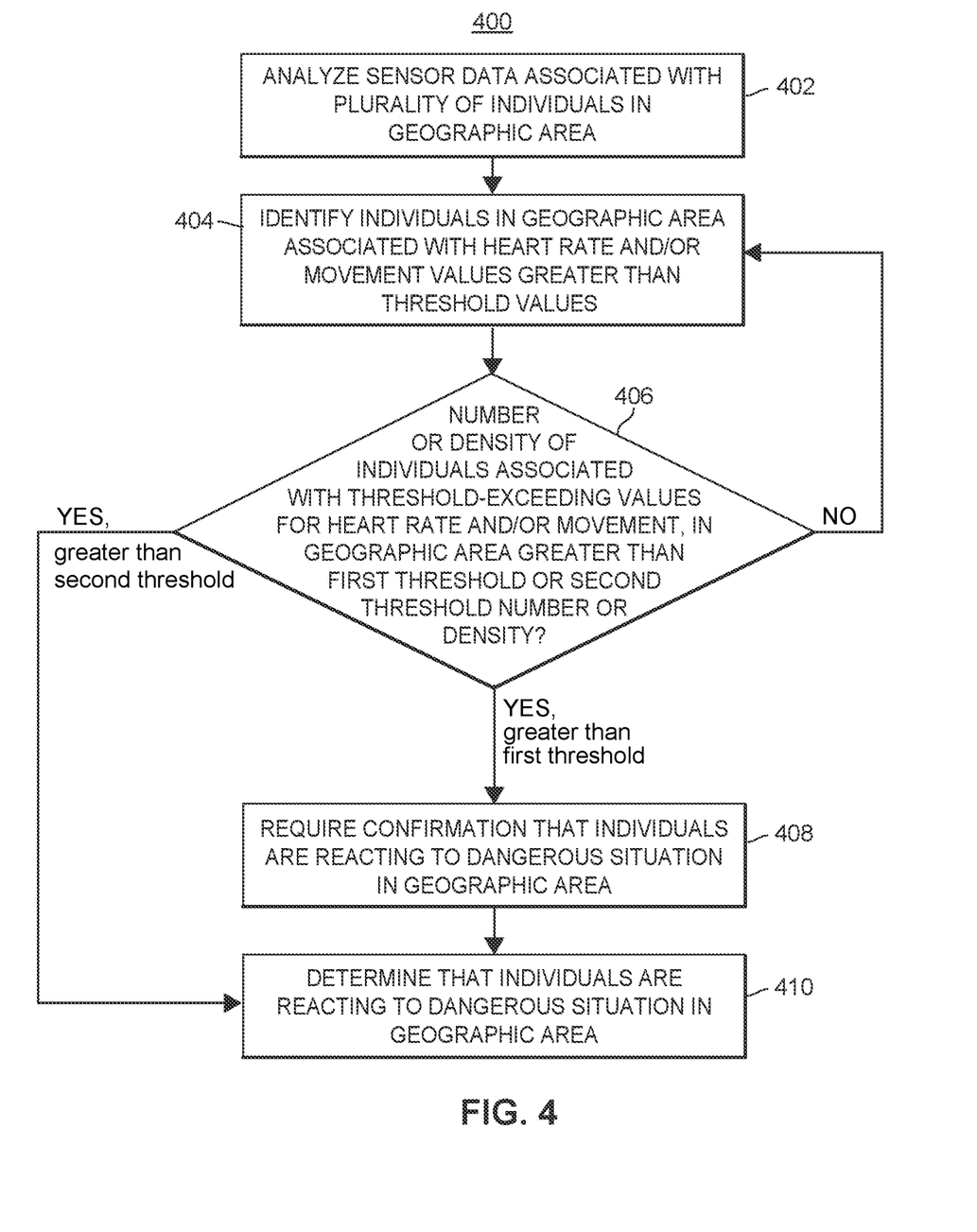
FIG. 4 illustrates an exemplary flow diagram of an exemplary method for determining that individuals are reacting to a possible dangerous situation in a given location, in accordance with some embodiments.

FIG. 4 illustrates an exemplary flow diagram of an exemplary method 400 for determining that individuals are reacting to a possible dangerous situation in a given location, in accordance with some embodiments. One or more steps of the method 400 may be implemented as a set of instructions stored on a computer-readable memory 122 and executable on one or more processors 120.

At block 402, sensor data associated with a plurality of individuals within a geographic area may be analyzed. Such sensor data may include data over an interval of time from one or more types of sensors associated with each of the plurality of individuals. In some embodiments, a plurality of partially overlapping geographic areas may be analyzed to determine various groups of pluralities of individuals in relative proximity. In further embodiments, one or more geographic areas may be determined based upon detection of a minimum number of individuals providing sensor data within a maximum area threshold, a minimum density of individuals providing sensor data within a fixed or variable area, or other similar metric relating to sufficiency of sensor data from a plurality of individuals.

At block 404, based on the analysis, individuals associated with sensor data, such as heart rate data and/or movement data, greater than respective threshold values for these respective types of data (and/or otherwise outside of respective threshold ranges of values for these respective types of data) may be identified. The thresholds may include an absolute level (e.g., a threshold heart rate or movement speed), or the thresholds may include a rate of change (e.g., a rise in heart rate over a certain time interval or a change in movement speed).

At block 406, a determination may be made as to whether the number of individuals in the geographic area (and/or the density of individuals per square foot, percentage of individuals, or other relative measure) associated with heart rate data and/or movement data greater than respective threshold values for these respective types of data exceeds a first threshold number and/or density value or a second threshold number and/or density value. For instance, the second threshold number and/or density value may be greater than the first threshold number and/or density value. For example, the first threshold number and/or density value may be 10 individuals or 10 individuals per 100 square feet associated with heart rate data and/or movement data greater than respective threshold values for these respective types of data, while the second threshold number and/or density value may be 20 individuals or 25 individuals per 100 square feet associated with heart rate data and/or movement data greater than respective threshold values for these respective types of data. Additionally or alternatively, first and second thresholds for each type of sensor data may be used (e.g., 50% of individuals in the geographic area with 90 beats per minute heart rate or 5 miles per hour movement speed for a first threshold level and 75% of individuals in the geographic area with 120 beats per minute heart rate or 8 miles per hour movement speed for a second threshold level).

If the number and/or density of individuals in the geographic area associated with heart rate data and/or movement data greater than respective threshold values for these respective types of data does not exceed either the first or the second threshold number and/or density (block 406, NO), the method 400 may proceed to block 404, where individuals in the geographic area associated with heart rate and/or movement values greater than respective threshold values for these respective types of data are identified. For instance, such individuals may be identified at set time intervals, e.g., every five minutes, every minute, every thirty seconds, etc.

If the number and/or density of individuals in the geographic area associated with heart rate data and/or movement data greater than respective threshold values for these respective types of data exceeds the first threshold number and/or density (block 406, YES, greater than first threshold), the method 400 may proceed to block 408, where additional confirmation that individuals are reacting to a dangerous situation in the geographic area may be required. For instance, in some examples, the additional confirmation may be confirmation from a mobile computing device associated with one of the individuals (e.g., as discussed with respect to blocks 306 and 308 of FIG. 3). Moreover, in some examples, the additional confirmation may be automatic, i.e., based upon a second type of data associated with the individuals. For example, if the individuals identified at block 404 were individuals with elevated heart rates above threshold heart rate values, movement data associated with these individuals may be used as confirmation (at block 408) in order to determine, at block 410, that the individuals are reacting to a dangerous situation. For instance, movement data associated with these individuals indicating that the individuals are moving with speeds greater than threshold speeds, indicating that the individuals are accelerating with greater than a threshold acceleration, and/or otherwise indicating that the individuals are running in various directions may be used as confirmation (at block 408) in order to determine, at block 410, that the individuals are reacting to a dangerous situation. As another example, if the individuals identified at block 404 were individuals with elevated acceleration or velocity values above threshold levels, heart rate data associated with these individuals may be used as confirmation (at block 408) in order to determine, at block 410, that the individuals are reacting to a dangerous situation. For instance, heart rate data associated with these individuals indicating that the individuals are associated with elevated heart rates above threshold heart rate values may be used as confirmation (at block 408) in order to determine, at block 410, that the individuals are reacting to a dangerous situation.

If the number and/or density of individuals in the geographic area associated with heart rate data and/or movement data greater than respective threshold values for these respective types of data exceeds the second threshold number and/or density (block 406, YES, greater than second threshold), the method 400 may proceed to block 410, where a determination may be made that individuals are reacting to a dangerous situation in the geographic area, i.e., without requiring any secondary confirmation, in some examples. Thus, a stronger response by a group of individuals (e.g., more individuals responding or stronger average responses by the individuals) may be used to determine with greater accuracy the occurrence of a dangerous situation, thereby enabling the method 400 to increase response speed by proceeding to an automated response without further confirmation.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs triggering an emergency call based on sensor data indicative of the response of a number of users in a given location to a possible emergency situation. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method, comprising:
   receiving, by one or more processors, an indication of sensor data captured by respective sensors associated with each of a plurality of individuals in a geographic area;
   monitoring, by the one or more processors, a number of individuals, of the plurality of individuals, that are associated with sensor data exceeding a threshold value for the sensor data;
   determining whether the number of individuals exceeds a first threshold number of individuals or a second threshold number of individuals;
   sending, by the one or more processors, a request for confirmation of a possible dangerous situation to respective mobile computing devices associated with each of the plurality of individuals in the geographic area, based on determining that the number of individuals exceeds the first threshold number of individuals but not the second threshold number of individuals;
   receiving, by the one or more processors, a confirmation of the possible dangerous situation from a mobile computing device associated with at least one of the plurality of individuals in the geographic area; and
   establishing, by the one or more processors, a synchronous voice or video communication connection between an emergency services dispatcher and one or more of respective mobile computing devices associated with each of the plurality of individuals in the geographic area to facilitate dispatching emergency services to the geographic area based on an indication that each of the plurality of individuals is reacting to the possible dangerous situation in the geographic area, wherein establishing the communication connection is based on receiving the confirmation.

2. The computer-implemented method of claim 1, wherein the respective sensors associated with each of the plurality of individuals in a geographic area include heart rate sensors, and wherein the indication that each of the plurality of individuals is reacting to the possible dangerous situation in the geographic area includes a respective spike in heart rate associated with each of the plurality of individuals within a period of time having a duration shorter than a threshold duration.

3. The computer-implemented method of claim 1, wherein the respective sensors associated with each of the plurality of individuals in a geographic area include motion sensors, and wherein the indication that each of the plurality of individuals is reacting to the possible dangerous situation in the geographic area includes a respective spike in motion associated with each of the plurality of individuals within a period of time having a duration shorter than a threshold duration.

4. The computer-implemented method of claim 1, wherein the respective sensors associated with each of the plurality of individuals are components of respective mobile computing devices associated with each of the plurality of individuals.

5. The computer-implemented method of claim 4, wherein at least one of the respective mobile computing devices associated with each of the plurality of individuals is a wearable mobile computing device.

6. The computer-implemented method of claim 1, wherein receiving the indication of the data captured by respective sensors associated with each of the plurality of individuals in the geographic area includes receiving indications of a first type of data captured by first respective sensors associated with each of the plurality of individuals in the geographic area and receiving indications of a second type of data captured by second respective sensors associated with each of the plurality of individuals in the geographic area; and
   wherein determining the indication that each of the plurality of individuals is reacting to the possible dangerous situation in the geographic area includes determining a first indication that each of the plurality of individuals is reacting to the possible dangerous situation in the geographic area based on the first type of data captured by the first respective sensors, and verifying the first indication that each of the plurality of individuals is reacting to the possible dangerous situation based on the second type of data captured by the second respective sensors.

7. A system including:
   one or more processors; and
   a non-transitory program memory communicatively coupled to the one or more processors and storing executable instructions that, when executed by the one or more processors, cause the processors to:

receive an indication of sensor data captured by respective sensors associated with each of a plurality of individuals in a geographic area;
monitor a number of individuals, of the plurality of individuals, that are associated with sensor data exceeding a threshold value for the sensor data;
determine whether the number of individuals exceeds a first threshold number of individuals or a second threshold number of individuals;
send a request for confirmation of a possible dangerous situation to respective mobile computing devices associated with each of the plurality of individuals in the geographic area, based on determining that the number of individuals exceeds the first threshold number of individuals but not the second threshold number of individuals;
receive a confirmation of the possible dangerous situation from a mobile computing device associated with at least one of the plurality of individuals in the geographic area; and
establish a synchronous voice or video communication connection between an emergency services dispatcher and one or more of respective mobile computing devices associated with each of the plurality of individuals in the geographic area to facilitate dispatching emergency services to the geographic area based on an indication that each of the plurality of individuals is reacting to the possible dangerous situation in the geographic area, wherein establishing the communication connection is based on receiving the confirmation.

8. The system of claim 7, wherein the respective sensors associated with each of the plurality of individuals in a geographic area include heart rate sensors, and wherein the indication that each of the plurality of individuals is reacting to the possible dangerous situation in the geographic area includes a respective spike in heart rate associated with each of the plurality of individuals within a period of time having a duration shorter than a threshold duration.

9. The system of claim 7, wherein the respective sensors associated with each of the plurality of individuals in a geographic area include motion sensors, and wherein the indication that each of the plurality of individuals is reacting to the possible dangerous situation in the geographic area includes a respective spike in motion associated with each of the plurality of individuals within a period of time having a duration shorter than a threshold duration.

10. The system of claim 7, wherein the respective sensors associated with each of the plurality of individuals are components of respective mobile computing devices associated with each of the plurality of individuals.

11. The system of claim 10, wherein at least one of the respective mobile computing devices associated with each of the plurality of individuals is a wearable mobile computing device.

12. The system of claim 7, wherein receiving the indication of the data captured by respective sensors associated with each of the plurality of individuals in the geographic area includes receiving indications of a first type of data captured by first respective sensors associated with each of the plurality of individuals in the geographic area and receiving indications of a second type of data captured by second respective sensors associated with each of the plurality of individuals in the geographic area; and
wherein determining the indication that each of the plurality of individuals is reacting to the possible dangerous situation in the geographic area includes determining a first indication that each of the plurality of individuals is reacting to the possible dangerous situation in the geographic area based on the first type of data captured by the first respective sensors, and verifying the first indication that each of the plurality of individuals is reacting to the possible dangerous situation based on the second type of data captured by the second respective sensors.

13. A non-transitory computer readable storage medium storing computer-readable instructions that, when executed by one or more processors, cause the one or more processors to:
receive an indication of sensor data captured by respective sensors associated with each of a plurality of individuals in a geographic area;
monitor a number of individuals, of the plurality of individuals, that are associated with sensor data exceeding a threshold value for the sensor data;
determine whether the number of individuals exceeds a first threshold number of individuals or a second threshold number of individuals;
send a request for confirmation of a possible dangerous situation to respective mobile computing devices associated with each of the plurality of individuals in the geographic area, based on determining that the number of individuals exceeds the first threshold number of individuals but not the second threshold number of individuals;
receive a confirmation of the possible dangerous situation from a mobile computing device associated with at least one of the plurality of individuals in the geographic area; and
establish a synchronous voice or video communication connection between an emergency services dispatcher and one or more of respective mobile computing devices associated with each of the plurality of individuals in the geographic area to facilitate dispatching emergency services to the geographic area based on an indication that each of the plurality of individuals is reacting to the possible dangerous situation in the geographic area, wherein establishing the communication connection is based on receiving the confirmation.

14. The non-transitory computer readable storage medium of claim 13, wherein the respective sensors associated with each of the plurality of individuals in a geographic area include heart rate sensors, and wherein the indication that each of the plurality of individuals is reacting to the possible dangerous situation in the geographic area includes a respective spike in heart rate associated with each of the plurality of individuals within a period of time having a duration shorter than a threshold duration.

15. The non-transitory computer readable storage medium of claim 13, wherein the respective sensors associated with each of the plurality of individuals in a geographic area include motion sensors, and wherein the indication that each of the plurality of individuals is reacting to the possible dangerous situation in the geographic area includes a respective spike in motion associated with each of the plurality of individuals within a period of time having a duration shorter than a threshold duration.

16. The non-transitory computer readable storage medium of claim 13, wherein the respective sensors associated with each of the plurality of individuals are components of respective mobile computing devices associated with each of the plurality of individuals.

17. The non-transitory computer readable storage medium of claim 16, wherein at least one of the respective mobile computing devices associated with each of the plurality of individuals is a wearable mobile computing device.

\* \* \* \* \*